United States Patent [19]
Farmont

[11] Patent Number: 4,618,176
[45] Date of Patent: Oct. 21, 1986

[54] WINDOW OPENER

[75] Inventor: Rolf Farmont, Düsseldorf, Fed. Rep. of Germany

[73] Assignee: ASC Auto Spezial Carosserie Vertrieb GmbH, Düsseldorf, Fed. Rep. of Germany

[21] Appl. No.: 558,640

[22] Filed: Dec. 6, 1983

[30] Foreign Application Priority Data

Dec. 15, 1982 [DE] Fed. Rep. of Germany ....... 3246396
Jun. 4, 1983 [DE] Fed. Rep. of Germany ....... 3320343

[51] Int. Cl.$^4$ ............................................. E05C 17/34
[52] U.S. Cl. ..................................... 292/263; 292/277
[58] Field of Search ............... 292/263, 266, 269, 277; 403/93, 96; 16/328-330; 297/363-365; 70/232

[56] References Cited

U.S. PATENT DOCUMENTS

| 1,716,356 | 6/1929 | Thompson | 292/263 |
| 2,316,695 | 4/1943 | Jaffa | 70/232 |
| 2,745,692 | 5/1956 | Persson | 292/263 |
| 4,216,844 | 8/1980 | Klafs | 16/329 X |
| 4,257,632 | 3/1981 | De Stepheno | 292/263 |
| 4,339,844 | 7/1982 | Shatters | 403/96 X |
| 4,371,206 | 2/1983 | Johnson | 297/364 |
| 4,403,373 | 9/1983 | Kummerlin | 16/328 X |

FOREIGN PATENT DOCUMENTS

| 853269 | 8/1952 | Fed. Rep. of Germany. | |
| 324327 | 9/1902 | France. | |
| 1310558 | 10/1962 | France | 297/365 |
| 329187 | 5/1930 | United Kingdom. | |
| 742019 | 12/1955 | United Kingdom. | |

Primary Examiner—Robert L. Wolfe
Assistant Examiner—Russell W. Illich
Attorney, Agent, or Firm—Martin A. Farber

[57] ABSTRACT

In a window opener, for instance for automotive vehicles, consisting of a toggle lever joint (1) which is mounted for movement on both sides and has a toggle lever joint (2) as well as levers (3, 4), with a detent mechanism having a detent disk which is mounted for axial displacement and can be disengaged against spring pressure and has detent elements distributed on its circumference, a high holding force of the detent mechanism (7) and nevertheless actuation of the window opener without great application of force or demands on the concentration of the user as well as considerable protection from injury are obtained by a grip which receives the detent mechanism (7) and consists of two grip arms (8, 9) protruding on both sides from one of the levers in the direction of the axis of the toggle joint (2), as well as a push button (11) arranged in one of the grip arms for the disengagement of the detent disk (15); two axially displaceably mounted detent disks (15, 15') which are disengageable against the same spring pressure and have detent elements distributed on their circumference are preferably provided.

15 Claims, 4 Drawing Figures

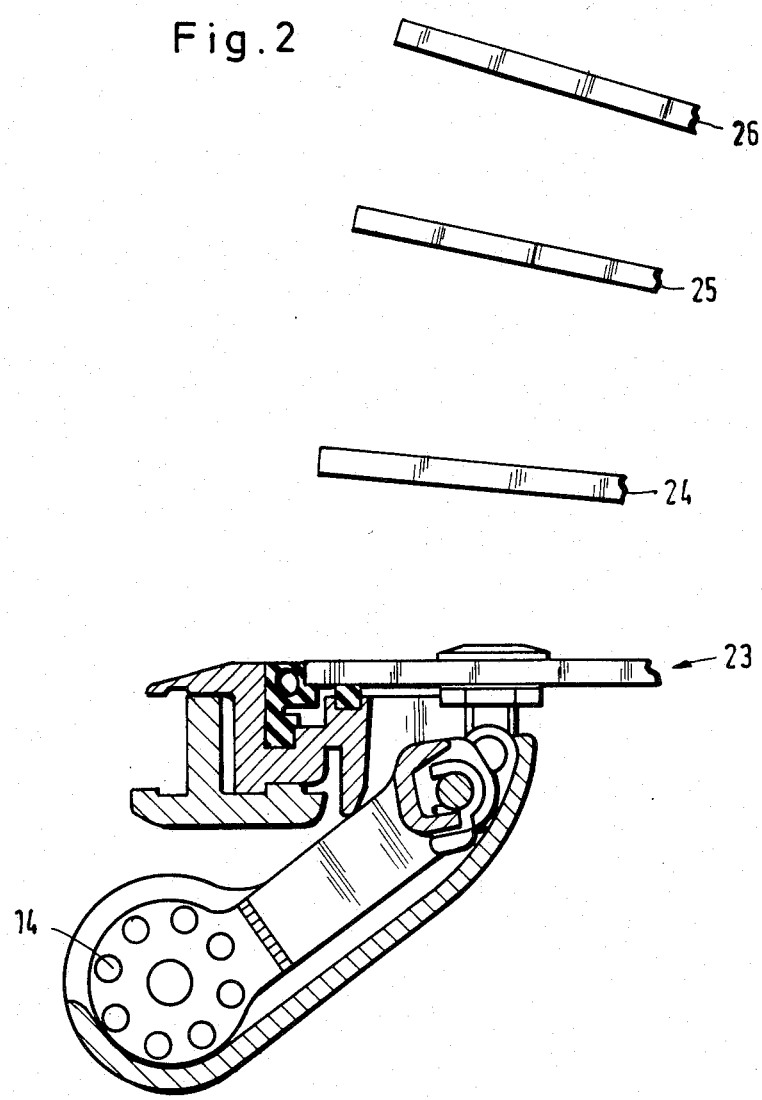

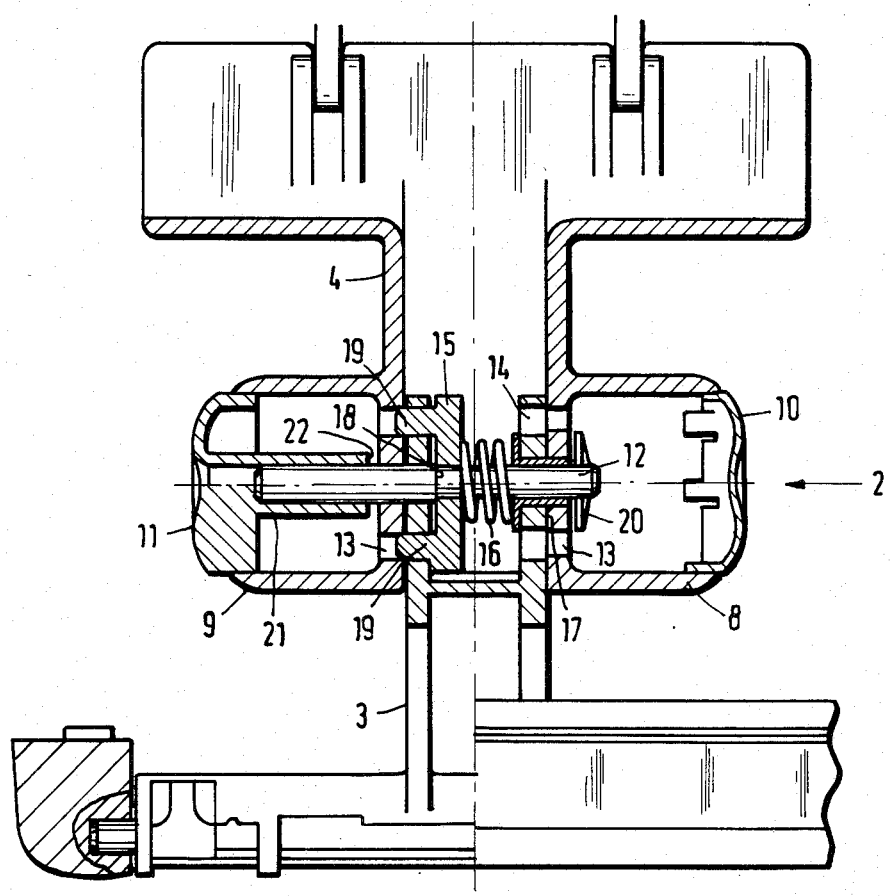

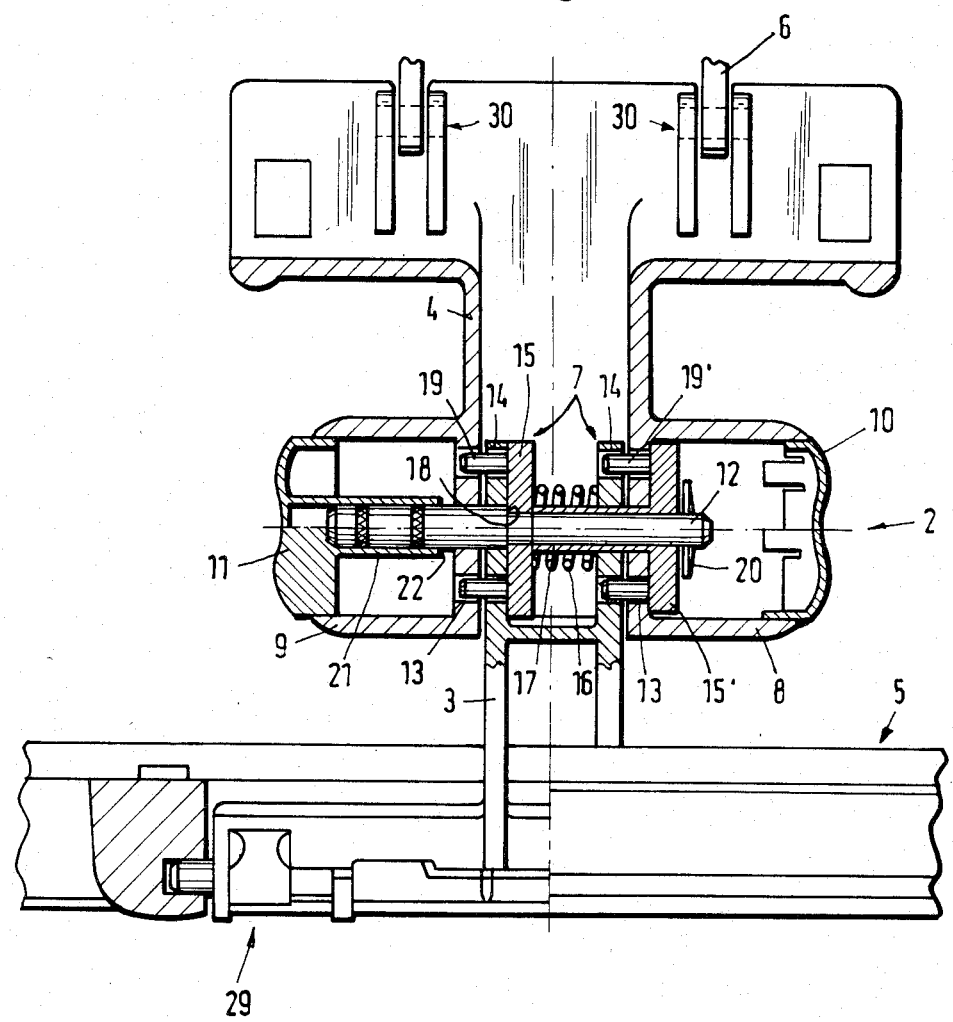

WINDOW OPENER

The present invention concerns a window opener, in general and a window opener for lift roofs of vehicles in particular.

Lockable window openers are used, in particular, in connection with swivel windows in automotive vehicles. They are intended to assure the locking of the window in different open positions and in that connection also to withstand differences in pressure on the two sides of the window surfaces, for instance as a result of wind pressure.

A window opener of the above-mentioned type is known from German Pat. No. 853 269 in which the locking device consists of a friction element arranged in the toggle joint. This window opener is operated by grasping, with the thumb and index finger of one hand, the ends of a hinge pin which have grip troughs on their front and thus pulling or pushing in the direction transverse to the hinge pin. Such actuation of the window opener requires, in combination with the friction element, the application of considerable force if the friction element is adjusted sufficiently tight for a secured open position of the window. This expenditure of force together with the necessity of searching for the grip troughs, however, interferes with the concentration of a driver who wishes to operate such a window opener during travel; furthermore, he can easily get his fingers caught between the levers. Finally the setting of a very specific angle of opening is relatively difficult with such a window opener since the static friction is greater than the sliding friction and therefore the desired position of opening is only rarely found upon the first attempt.

A window opener of the afore-mentioned type is known from French Pat. No. 324 327 in with which detent disks are held in engagement with each other under the axial pressure of a spring, they being developed in such a manner that the different detent positions can be changed by merely opening or closing the window further in customary fashion. For this purpose, it is merely necessary to overcome the force of the spring, which, however, is facilitated by the fact that the active lever arm length of a window wing is comparatively large. On the other hand, it is not possible to use this known window opener in the manner of a handle for the opening and closing of the window without the application of a large amount of force since suitable points of attack for this are not provided on the window opener and the spring force of the spring would have to be greatly reduced since the effective lever lengths would now be considerably shorter than upon the customary opening and closing of the window on the window wing itself. Such a reduction in the spring force and thus in the holding force of the detent mechanism would, however, have the result that the window wing even under a comparatively slight pressure of the wind would open or close further by itself, and overcome the lock established by the toggle lever joint without outside action on the part of the user.

The object of the invention is therefore to provide a window opener of the aforementioned type, particularly for lift roofs of vehicles, which can be dependably locked in different positions without the exertion of great force or any great demands on the concentration of the user; the danger of injuries should be substantially excluded; the detent mechanism should, at the same time, assure the highest possible holding force.

A window opener in accordance with the invention has the advantage that the entire hand is used to operate it and therefore the pulling or pushing force of the arm of the user is available without limitation; furthermore, a detent mechanism assures more reliable operation of the window opener with respect to the angle of opening since the same force is in all cases required from detent position to detent position; nevertheless ease of operation of the window opener together with a high holding force of the detent mechanism are obtained. In this way, it is merely necessary, upon the operation of the window opener for the spring force to be overcome, while in the engaged condition of the detent disk, the toggle joint withstands even extremely high forces on the window. Such a window opener can be made substantially of plastic parts without excessive wear occurring upon prolonged use. Furthermore, the detent mechanism of the invention permits the use also of very short grip arms since the force required to operate the window opener is extremely small and can be applied even by the thumb and index finger of one hand; the two grip arms can therefore also be developed as a housing for the joint which receives the detent mechanism and protrudes only slightly to the side of the levers.

The detent elements which are distributed on the periphery of detent disk(s) may consist of gear-tooth-like recesses with which corresponding projections on one or both levers are to be brought into engagement. There are preferred, however, detent elements in the form of detent projections which protrude in axial direction from one of the face surfaces of the corresponding detent disk and, in engaged condition, are in engagement with corresponding holes in the two levers. In this way, free mobility of the toggle joint is possible with the detent disk(s) disengaged and, in particular, a stop can be provided which permits the disengagement of the detent projections from only one of the levers in each case so that the detent disk(s) turn(s) only in respect to one of the levers in each case while the other lever assures a permanent guidance for the detent projections.

The push button for the disengagement of the detent disk(s) is preferably arranged in the end surface of one of the grip arms and is actuated there by the thumb of one hand. If corresponding holes are provided in the levers on both sides of the detent disk or for both detent disks, the detent mechanism can also be installed turned 180° in the toggle joint so that its actuation is readily possible also with the other hand. Such a conversion is simplified by the fact that the grip arm lying opposite the push button is equipped with a plug cap which is adapted to the shape of the push button. Such a window opener can, for instance, be used for hinged roofs (lift roofs) of a right-hand or left-hand drive car without other individual parts being necessary because of the change in the hand operating the window opener.

A bearing sleeve of one detent disk which rests on the other detent disk permits the simultaneous disengagement of the two detent disks in particularly simple manner.

In accordance with the invention, in the closed position of the window opener the detent mechanism is preferably disengaged and the levers are then in a self-locking position, since the lines of force between the corresponding joints of the two levers form with each other a small angle which extends beyond the parallel extended position of the levers. In this position, therefore, the corresponding teeth of the detent mechanism are so turned with respect to each other that they are not in engagement. A blow on the toggle joint in a direction oblique to the plane of the window and opposite the direction of the levers in the closed position therefore leads, above a certain hardness of blow, to the opening of the window opener. If the extent of the self-locking in the closed position is suitably selected, the special safety regulations governing operating elements in a car which protrude into the inside of the car can then be simply complied with.

The invention will be explained in further detail below with reference to an illustrative embodiment shown in the drawing, in which:

FIG. 2 shows the window opener of FIG. 1, in closed position;

FIG. 3 shows a window opener according to FIG. 1 in plan view, partly in section, and FIG. 4 shows a similar window opener in a showing similar to FIG. 3.

Figure 1:
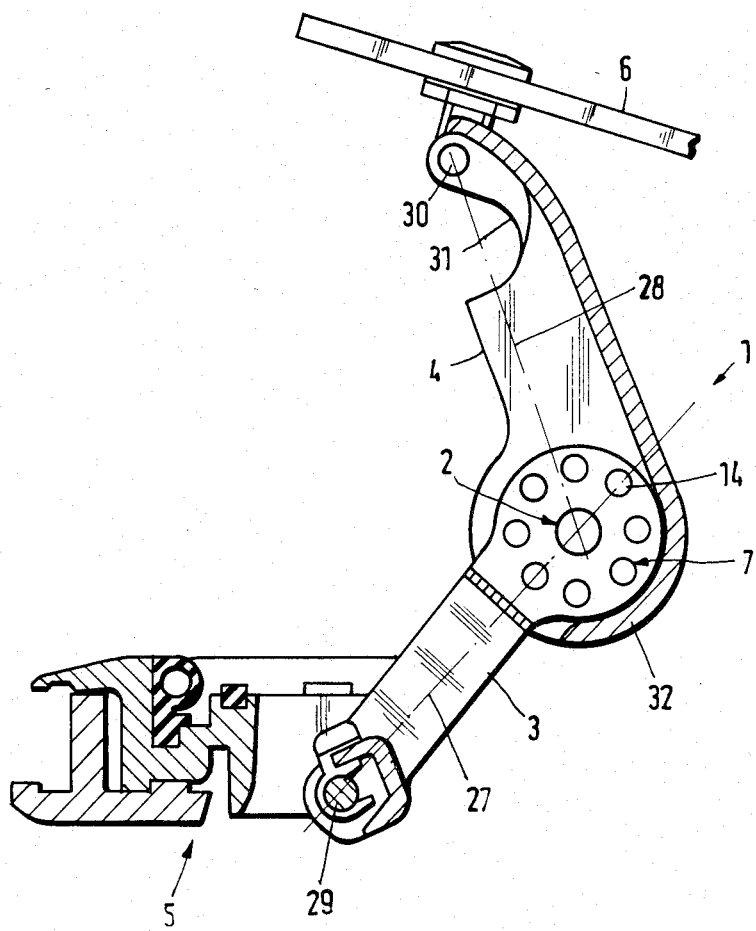
FIG. 1 shows a window opener in opened window position seen in side view, partly in section.

A window opener comprises levers 3, 4 of a toggle lever joint 1 which are pivotally connected to each other by a toggle joint 2, and are moveably mounted on one side on a window frame 5 and on the other side on a window wing 6 (not shown in detail) and of a detent mechanism 7. Grip arms 8, 9 protrude on both sides from the lever 4 in the direction of the axis of the toggle joint 2. The grip arm 8 is closed on its end by a plug cap 10 while a push button 11 forms the end surface of the other plug arm 9. The grips arms 8, 9 together with their end surfaces jointly form a grip which is ergonomically favorable for operation by one hand, having rounded injury-proof transitions towards the end surfaces. The grip arms are identical in shape and hollow; the push button is therefore guided on its radial outer surface by the inner wall of the grip arm 9.

The levers 3 and 4 have a U-shaped cross section and are provided in the region of the U flanks with eight holes 13, 14 distributed uniformly on a circle (around a hinge pin 12 which is inserted through concentric holes in the U flanks). The cross section of the lever 4 is so much larger that it receives on its inner surface the outer surface of the lever 3 in form-locked fashion. The U flanks are enlarged in the region of the toggle joint 2 to form an approximately circular surface, through the middle of which surface a pivot pin 12 extends in alignment through both levers. Furthermore the U flanks have holes 13, 14 arranged with a 45° pitch on a circle around the hinge pin, the holes coming into alignment with each other upon movement of the toggle lever joint after each 45° movement of both levers (with respect to the toggle joint). In such aligned position the detent mechanism 7 can be brought into engagement. For this purpose a centrally bored detent disk 15 is placed within the U flanks of the lever 3 on the pivot or mounting pin 12 and supported by means of a coil spring 16 on one side against the opposite U flank and on the other side against a collar 18 on the mounting pin 12. A second detent disk 15' (FIG. 4) also has a central bore and is connected integrally with a bearing sleeve 17 for the pin 12; this detent disk is also placed on the pivot pin 12 and is located outside the lever 4 on its side lying opposite the push button 11. The bearing sleeve 17 is placed through both levers 3 and 4 on the side of the detent disk 15' and rests at its end against the detent disk 15, by which it is carried along. The detent disk(s) bears (bear) detent projections 19 and 19' which extend in axial direction and are arranged with a uniform 45° pitch on a circle around the axis, the projections engaging in the corresponding detent positions into both the holes 14 and the holes 13 of the levers 3 and 4. The detent projections are of cylindrical shape, their outside diameter being slightly smaller than the diameter of the holes 13 and 14 respectively.

If the window opener is to move upon a harder blow on the toggle joint 2 without the detent projections 19 being broken off or excessively worn thereby—which is particularly important in the case of detent projections of plastic—the free ends of the detent projections in accordance with the invention have the shape of a hemisphere (FIG. 3) and the holes 13 have a slightly smaller diameter than the diameter of the detent projections. In this way, the free ends of the detent projections form a slide-on surface for the projection-side edges of the holes 13 so that, upon a blow of given intensity on the toggle joint, an axial force is exerted on the detent disk which permits its displacement against the pressure of the spring 16 and thus its complete disengagement.

The pivot pin 12 is prevented from dropping out on the side of the cover cap 10 on the outside of one U flank of the lever 4 by an ordinary ring-type retainer 20. The bearing sleeve 17 acts not only to reduce wear and form the stop for the spring 16 (FIG. 3) or the resting surface of the detent disk 15' against the detent disk 15 (FIG. 4), but it also fills up a small space between the outer surface of the pivot pin 12 and the corresponding joint hole of the levers 3 and 4 which results from the fact that the pivot pin, as a result of the collar 18, has a larger diameter on the push button side but nevertheless is to be installed from both sides into the toggle joint 2. The push button 11 is placed onto the thicker side of the pivot pin 12 by means of a sleeve-shaped slide-locked extension 21 which forms a stop 22 at its end. This stop is so selected that the push button 11 can displace the detent disk(s) 15 (and 15') axially only by the distance which is necessary for the disengagement of the detent projections 19 (and 19') from the holes 13 in the lever 4 and the holes 14 in the lever 3.

In FIG. 2, the closed position 23 and open positions 24 to 26 of the window wing 6 are shown. In the closed position, the imaginary connecting lines 27, 28 between the toggle lever joint 2 and the frame-side articulation 29 of the lever 3 as well as the window-side articulation 30 of the lever 4 form such a small angle that the articulation 2, 29 and 30 no longer lie on a straight line but, rather, the articulation 29 rests past the connecting line 28 in a recess 31 in the lever 4 and thus is located— beyond its dead center—in a self-locking position. In this position, the detent projections 19 (and 19') in the holes 13 and 14 respectively are not in engagement, so that the push button 11 with its, for instance, red indicating color can be seen only from its end but not at a right angle thereto since it is practically completely within the grip arm 9. The first engagement of the detent projections 19 (and 19') and the holes 13 and 14 respectively occurs in the position 24 (FIG. 2) of the window, for the reaching of which the toggle joint 2 must be turned by a considerably greater angle than 45° around the joint 29 on the window frame 5. A blow on the toggle joint 2 which is effected on the closed window obliquely and opposite the direction of the levers 3, 4 leads—if this blow is sufficient to overcome the self-locking of the window opener—to a considerable yielding of the toggle joint before this movement is retarded in the first opened position unless this movement is even continued further since the round ends (FIG. 3) of the detent projections 19 do not form a rigid engagement.

The self-locking is advantageously of such amount that a blow directed at an angle with 15° with respect to the closed window against the toggle joint 2 in direction of the levers 3, 4 with a force of at most 400N leads to the automatic opening of the window opener. In this way, therefore, extensive protection against accidents is obtained. Furthermore, the push button 11 always protrudes from the free end of the grip arm 9 in the different open positions of a window; in this way, when an indicator color is used it can be seen or else felt by the operating finger so that at all times it can be readily noted whether the hinged window is properly closed.

A projection 32 on the toggle-joint-side end of the lever 4 forms a stop against the lever 3 in the event that the maximum permissible position of opening of the window has been reached.

The best solution is shown in FIG. 4.

I claim:

1. In an opening device comprising a toggle lever joint comprising two levers which are attached at respective ends to an openable part and to a stationary part respectively and are permanently pivotally connected at other ends of the levers to each other forming a permanent single pivot, via a toggle joint having a detent mechanism and a pivot pin passing through the two levers, the detent mechanism comprising at least one detent disk mounted displaceably in an axial direction of the pivot pin and operatively disengagable from one of the levers against spring force and connected non-rotatably to the other of said levers, said detent disk having face surfaces and axially projecting detent elements distributed on one of the face surfaces, said detent elements cooperating with corresponding detent parts respectively of said one lever in respectively engaged conditions such that the openable part can be held fixed in various open positions relative to said stationary part, the improvement comprising
a grip receiving said detent mechanism and said pivot pin comprising two coaxial short grip arms which project laterally on both sides from said one lever in the axial direction of said pivot pin,
means comprising a push button for operatively disengaging said detent disk from said one lever by pushing said push button such that said detent elements disengage from said detent parts of said one lever, said push button being arranged axially displaceably in one of said grip arms for said pushing, and
said disengaging means further comprises said pivot pin, said pivot pin being axially displaceable in said grip, said pivot pin engaging at one end thereof said push button and at another portion thereof said detent disk,
said first-mentioned respective ends are freely pivotally connected to said stationary and openable parts respectively but axially immovable relative thereto,
said two levers have said detent parts forming a plurality of closed detent holes, said detent elements of said detent disk are in engagement in said engaged conditions with respective said detent holes in both of said two levers,
said levers are U-shaped and have U flanks on both sides of said detent disk, said detent holes are formed in said U flanks, and
said levers are axially immoveable at said toggle joint, said U-flanks of one of said levers overlying and abutting respective said U-flanks of said other lever and defining thereat coaxially aligned openings, said pivot pin extending axially displaceably but nonremovably through said aligned openings.

2. The device according to claim 1, wherein
said one grip arm has an open free end,
said push button projects from said open free end of said one grip arm forming an end surface for said one grip arm in said engaged conditions.

3. The device according to claim 1, further comprising
a plug cap disposed in an open free end of the other grip arm, said cap corresponding to the shape of the push button.

4. The device according to claim 1, further comprising
stop means for limiting disengagement of the detent elements from said detent holes in only said one lever upon pushing of said push button.

5. The device according to claim 4, wherein
said stop means comprises a free end of said push button coaxially mounted on the periphery of said pivot pin, said free end is disposed inside of said one grip arm and spaced from said one lever adjacent said detent parts in said engaged conditions and abuts said one lever adjacent said detent parts upon pushing of said push button.

6. The device according to claim 1, wherein
said detent elements consist of eight detent projections distributed uniformly on said one face surface of said detent disk.

7. The device according to claim 1, wherein
said detent mechanism is disengaged by said detent elements disengaging from said detent parts in a closed position of the toggle lever joint such that said two levers are substantially folded together and self-lock with each other.

8. The device according to claim 1, wherein
at least said levers and said detent disk are made of plastic.

9. The device according to claim 1, wherein
said openable part is a swivel window of an automotive vehicle.

10. The device according to claim 1, wherein
said openable part is a sun roof of an automobile.

11. The device according to claim 1, wherein
two of said detent disks are provided mounted on said pivot pin, spaced from each other, and connected for joint displacement by said disengaging means,
spring means for biasing said detent disks so that said detent elements engage in said corresponding detent holes in respective of said U flanks of said two levers.

12. The device according to claim 11, wherein
said spring means is a compression spring disposed about said pivot pin engaging one of said detent disks and one of said U flanks of the other lever.

13. The device according to claim 12, wherein
said U flanks of the other lever are disposed centrally between said U flanks of said one lever, and
said detent elements of both of said detent disks project toward said push button.

14. The device according to claim 13, further comprising
stop means for limiting disengagement of the detent elements of one of said detent disks from said detent holes in only said one lever limiting disengagement of the detent elements of the other of said detent disks from said detent holes only of said other lever upon pushing of said push button.

15. The device according to claim 14, wherein said stop means comprises a free end of said push button coaxially mounted on the periphery of said pivot pin, said free end is disposed inside of said one grip arm and spaced from said one lever adjacent said detent parts in said engaged conditions and abuts said one lever adjacent said detent parts upon pushing of said push button.

* * * * *